Aug. 12, 1930. C. B. THORIN 1,772,528
COMBINED COOKER AND COOLER
Filed March 20, 1926 3 Sheets-Sheet 1
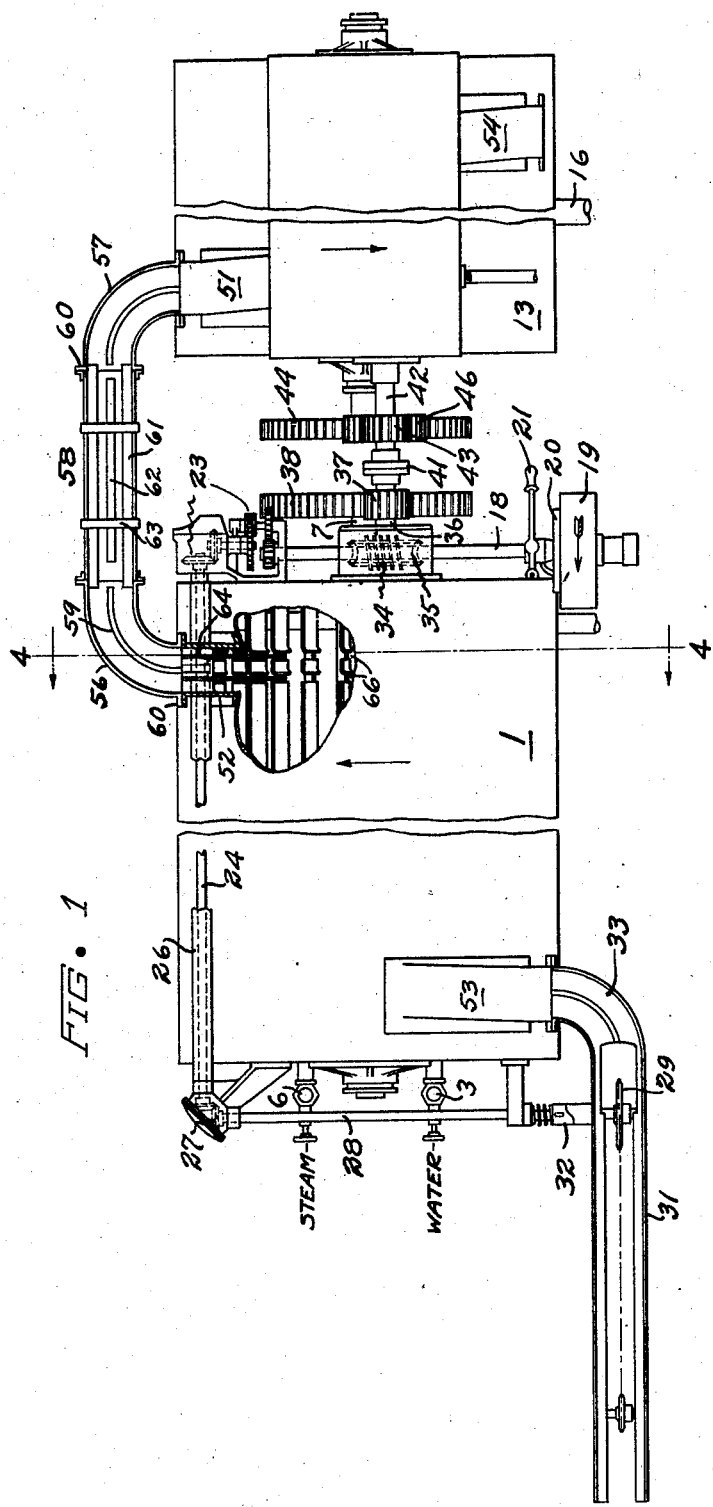
INVENTOR
Carl B. Thorin
By Charles L. Evans
His Attorney.

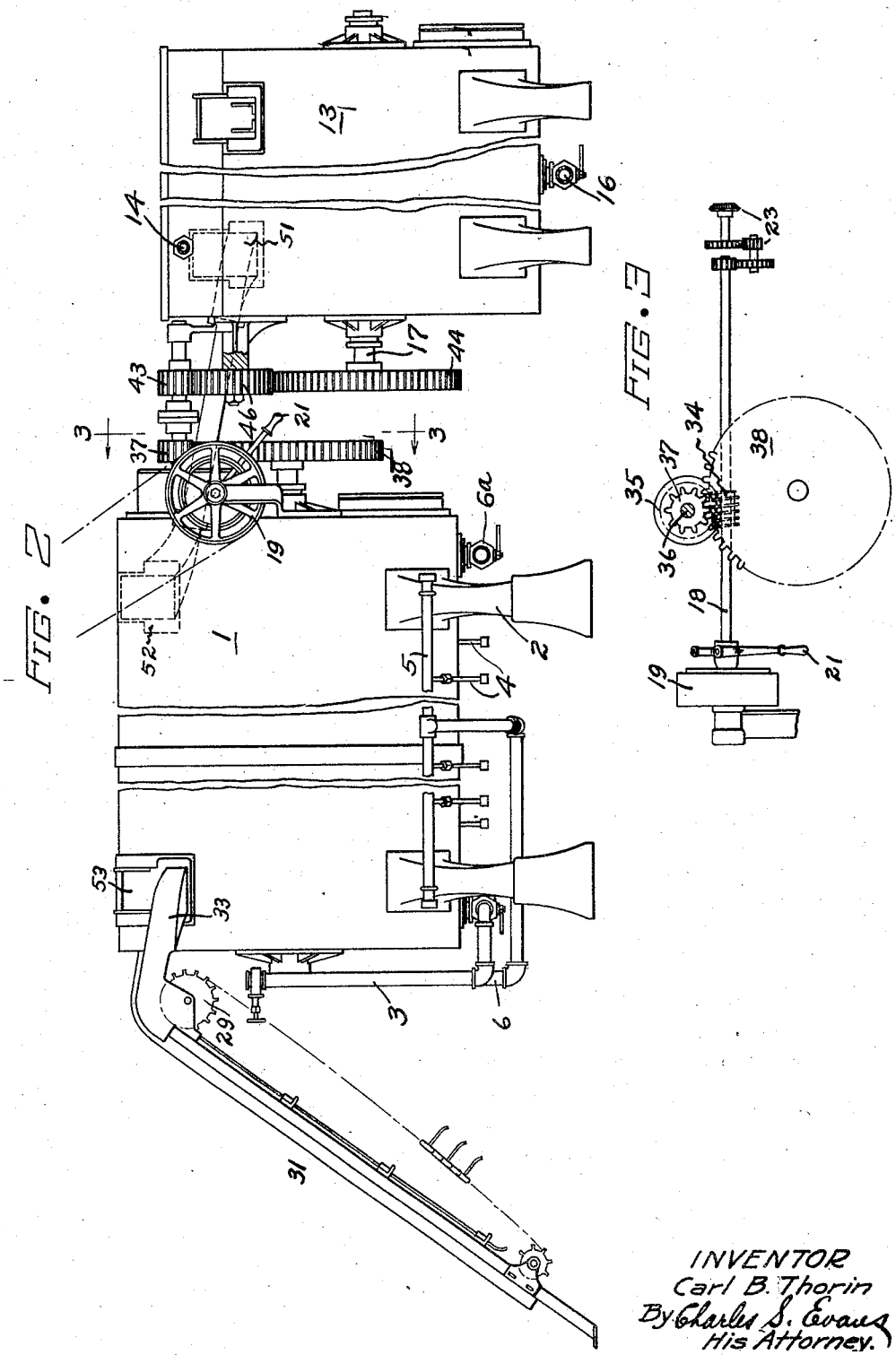

Aug. 12, 1930.  C. B. THORIN  1,772,528
COMBINED COOKER AND COOLER
Filed March 20, 1926    3 Sheets-Sheet 3
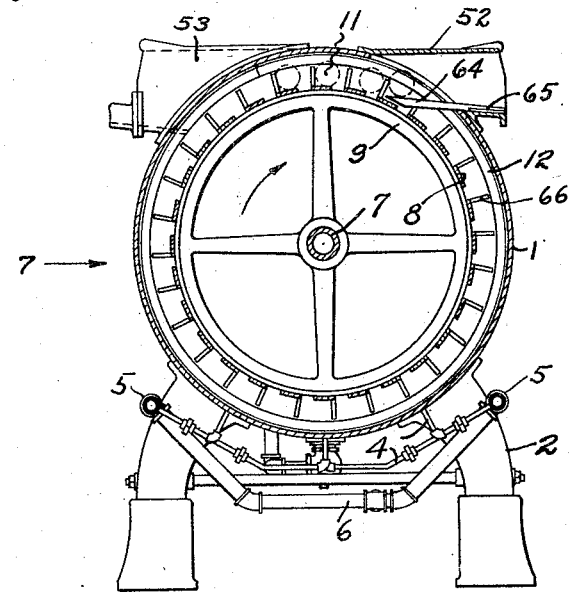
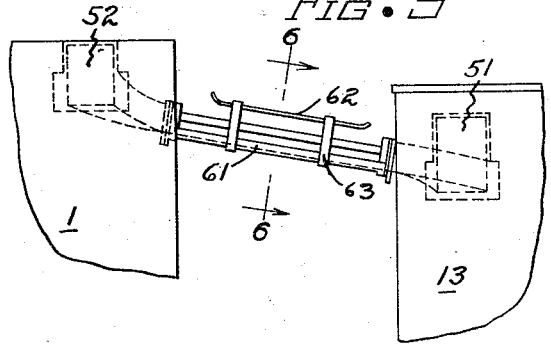
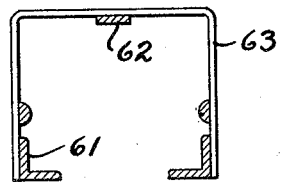
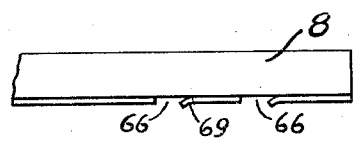
INVENTOR
Carl B. Thorin
By Charles S. Evans
His Attorney.

Patented Aug. 12, 1930

1,772,528

UNITED STATES PATENT OFFICE

CARL B. THORIN, OF SAN JOSE, CALIFORNIA, ASSIGNOR TO SPRAGUE-SELLS CORPORATION, OF HOOPESTON, ILLINOIS, A CORPORATION OF DELAWARE

COMBINED COOKER AND COOLER

Application filed March 20, 1926. Serial No. 96,345.

My invention relates to an apparatus for treating packaged goods, and especially to a combined cooker and cooler for use in canneries.

In the preserving of foodstuffs it is desirable to cool the heated can promptly, as soon as the cooking operation is completed. In the past it has been the practice to conduct the heated cans to a cooler by means which permitted the material within the can to continue cooking for an appreciable period after removal from the cooker. This is an objectionable practice since it destroys the nice control of the cooking time which is essential to high quality of product. It is therefore one of the objects of my invention to provide for direct and rapid transmission of the cans from the cooking to the cooling operation.

Another object of the invention is the provision of improved means for removing the cans from the cooking and cooling drums.

It is a further object of my invention to provide a cooker and cooler mechanism which combines compactness with simplicity of construction and which is peculiarly free of danger to the workmen because of the improved means of driving the moving parts.

Another object of the invention is the provision of cooker and cooler drums into and from which the cans are moved closely adjacent the tops so that relatively large quantities of water may be retained in each drum.

My invention possesses other objects and features of advantage some of which, with the foregoing, will be set forth in the following description of my invention which is illustrated in the drawings accompanying and forming part of the specification. It is to be understood that I do not limit myself to the showing made by the said description, as I may adopt variant forms of my invention within the scope of the claims.

Referring to the drawings:

Figure 1 is a plan view of the apparatus, and Figure 2 is a side elevation thereof. Both views are shortened by showing the structure with portions broken away, and a portion of the drum in Figure 1 is omitted to show the enclosed mechanism.

Figure 3 is a detail in elevation of part of the driving mechanism. The plane of projection is indicated by the line 3—3 of Figure 2.

Figure 4 is a vertical sectional view taken in the plane indicated by the line 4—4 of Figure 1.

Figure 5 is a detail in elevation showing the transfer passage or track between the drums.

Figure 6 is a sectional view of the transfer passage or track. The plane of section is indicated by the line 6—6 of Figure 5.

Figure 7 is a detail in elevation of a portion of one of the can brackets of the carrier. The direction from which the view is taken is shown by the arrow 7 in Figure 4.

In terms of broad inclusion the apparatus of my invention comprises a plurality of alined drums, in each of which carrier means is disposed to convey the material undergoing treatment thru the drum. In handling packaged goods, such as cans of food, it is desirable to keep the can moving without sudden change in direction; that is to say, the can is fed into the carrier means in the direction of movement of the carrier and is taken off of the carrier in the same direction. It is also desirable to transfer the cans from the cooking stage to the cooling stage in as brief a period as possible; that is, along a path connecting the side of one of the drums adjacent its end, to the side of the next drum adjacent the adjacent end. This necessitates the movement of the carriers in opposite directions in adjacent drums; and in the driving means provided for my apparatus, I have introduced reversing mechanism between the two drums so that from a common drive shaft the carriers are oppositely rotated. The inlet and discharge passages are arranged high up in the structure so that an abundance of water may be kept in the drums. This is of special importance in the cooling drum in which it is desired to maintain as large a body of cold water as possible in order to more effectively absorb the heat from the hot cans. Improved means are also provided for extracting the cans from the carrier means. Means are also provided whereby all of the moving parts of the apparatus are driven from a single shaft controlled by a clutch pulley, so that danger to persons working around the apparatus is reduced to a minimum.

In terms of greater detail, the apparatus of my invention comprises a cooker drum 1, cylindrical in form, and supported on suitable legs 2. Water is admitted into the bottom of the drum thru the valved conduit 3, extending upwardly adjacent the end of the drum and connected to any suitable source of supply. Steam is admitted into the cooker drum thru the branch pipes 4 extending from the header pipes 5, one of which is arranged on each side of the drum and supported on the legs. The headers are connected to the steam supply line 6 which also extends upwardly adjacent the end of the drum, so that the water in the drum cannot drain out thru these pipes. Steam discharging into the bottom of the drum not only keeps the water heated to a cooking temperature but violently agitates the water so that the cans therein are subjected to an evenly distributed heat. A valve 6ª is provided in the bottom of the drum, so that water may be drained from the drum when necessary. Journalled within the drum on the shaft 7, is the rotary carrier frame, comprising a plurality of brackets or angle bars 8 supported on suitably spaced spiders or wheels 9. The angle bars are spaced about the rims of the spiders as indicated in Figure 4 so that the cans 11 may be supported thereon, and movement of cans along the bars and thru the cooker drum is secured by a spirally disposed guide rail 12 arranged on the inner surface of the drum.

Arranged close to the cooker drum and preferably longitudinally alined therewith is a cooler drum 13, thru which cold water is circulated by suitable pipe connections, the pipe 14 admitting the cold water at the top and the pipe 16 permitting it to escape at the bottom. Journalled within the cooler drum is a shaft 17, on which is disposed a carrier frame in all respects similar to the carrier frame in the cooker drum except that it is shorter, the cooler drum being usually shorter than the cooker drum.

Means are provided for driving the two carrier frames as a unitary mechanism but in opposite directions. Journalled in suitable bearings on the head of one of the drums and preferably between the drums is a jack-shaft 18, which is a shaft used to transfer power from a drive shaft to mechanism to be driven. On one end of shaft 18 is the pulley 19, between which and the shaft is interposed the clutch mechanism 20 of well-known form, operated by the handle 21. The pulley is driven by a suitable belt extending to a line shaft above. The opposite end of the shaft 18 is provided with gears 23 thru which connection is made to the longitudinally extending shaft 24, preferably enclosed in the housing 26. This shaft extends the full length of the cooker and is connected by means of the gears 27 with the transversely extending shaft 28 which drives the sprocket 29 of the elevator 31, thru a spring-held clutch 32 of known construction. In accordance with well-known practice the elevator 31 receives the cans and raises them to the runway 33 over which the cans roll into the cooker drum.

Fixed on the shaft 18 intermediate its end is a worm 34 in mesh with a worm wheel 35, fixed on the same shaft 36 with the pinion 37. The pinion is in mesh with the large gear 38 fixed on the end of the carrier shaft 7, so that the carrier is revolved at reduced speed from the shaft 18.

Alined with the shaft 36 and connected thereto by the flexible coupling 41, is a shaft 42, on which is fixed the pinion 43, connected to the large gear 44, which is fixed on the end of the cooler carrier shaft 17, thru the reversing gear 46. The pinions 37 and 43 are the same size, as are also the gears 38 and 44. Thus the cooler carrier is driven at the same speed as the cooker carrier, but in the opposite direction.

This reversal of the direction of movement of the carrier frames in the two drums is a very important part of my invention since it permits me to effect a very rapid transfer of the cans emerging from the cooker to the cooler and at the same time, keep the cans moving, on leaving and entering the drums, in the same direction as the carriers. The entrance passage 51 of the cooler drum is therefore placed at the end adjacent the cooker drum and on the same side of the group of drums as the discharge passage 52 of the cooker. These passages 51 and 52, like the inlet passage 53 of the cooker and the discharge passage 54 of the cooler are arranged tangentially so that the cans move into and out of the drums in the same direction as the movement of the carrier frame to which or from which they pass. Connecting the cooker discharge passage with the cooler inlet passage is a trackway or passage comprising the curved end sections 56 and 57, connected by the straight portion 58, so as to give the shortest possible passage between the openings.

The curved sections 56 and 57 comprise trough-like members in which a track 59 is arranged on the bottom, so that the cans readily roll around the curve. Flanges 60 on the ends of the curved section permit ready connection with similar flanges on the castings enclosing the outlet and inlet passages. The straight section of the passageway 58 is composed of angle bars 61 as shown in Figure 6 over which a retaining rail 62 is held by the brackets 63.

In order to utilize gravity in effecting the transfer of the cans from one drum to the next I prefer to somewhat elevate the cooker above the cooler drum as indicated in Figure 2 so that the passage or trackway is inclined and the cans roll readily from the cooker drum into the cooler drum.

Means are provided for extracting the cans on the rotary carrier frames from the cooker and cooler drums. As shown in Figures 1 and 4, the extracting means comprise a pair of transfer or pick-up arms 64, having the flanges 65 by which they are conveniently fixed in place. The arms are spaced apart a distance shorter than the length of the cans, and project from the mouth of the passage, in which they are located preferably tangentially toward the carrier frame. The ends of the transfer arms are beveled on the under side so as to eliminate any step at the end and facilitate the rolling of the cans upon them as they are carried around on the carrier frame. In order to permit the arms to be positioned close to the can-supporting surface of the carrier frame, the radial flanges of the angle bars on the frame are provided with notches 66 of width sufficient to clear the ends of the arms.

Since each can is pushed across these notches on its last trip around the drum, means are provided for preventing the seamed edge of the can from jamming against the edge of the notches. This structure is illustrated in both Figures 1 and 7. When the notches 66 are formed, the edge 69 toward which the cans move is bent downwardly a small amount so that the seamed edge of the cans, instead of striking a shoulder edge, rides up on the supporting surface without injury or jamming.

For purposes of the present description I have shown but two drums, but obviously the series may be extended to include a number of drums more than two. Certain features of my invention are also applicable to other arrangements of the several drums as well as to the series shown, but in every case I desire to facilitate a direct transfer of cans in the direction of the travel of the carriers, at the respective points of discharge and intake by means of a direct passage between adjacent sides of the drum; that is, by a passage which does not cross over from one side to the other of the series.

By the arrangement shown, one end of the cooker drum is left free for control devices and temperature and pressure indicating instruments, and a minimum amount of floor space is occupied. The drive from a single belt and the grouping of the driving gears between the drums is a safety measure of no small importance.

I claim:

1. In an apparatus for treating packaged goods, a pair of drums arranged longitudinally of one another, rotary carrier means for conveying the packages thru the drums, unitary means for rotating said carrier means in opposite directions, and means for conducting said packages from one drum to the other.

2. In an apparatus for treating packaged goods, a pair of drums, rotary carrier means for conveying the packages thru the drums, unitary means for rotating said carrier means in opposite directions, and a passage lying on the same side of the pair of drums for conducting said packages from one drum to the other.

3. An apparatus for treating packaged goods comprising a series of treating drums, rotary carrier means for the packages arranged in each drum, means disposed on one side of the series for gravitally conducting the packages from one drum to an adjacent drum, and means for rotating the carrier means in the direction of movement of the packages as they leave and enter the drums respectively.

4. An apparatus for treating packaged goods comprising a series of treating drums adjacent at their ends, rotary carrier means for the packages arranged in each drum, means disposed on one side of the series for conducting the packages from one drum to an adjacent drum, and means for rotating the carrier means in opposite directions.

5. In an apparatus for treating packaged goods, a pair of drums in longitudinal alinement, rotary carrier means for conveying the packages thru each drum, a jack shaft transversely arranged between the drums, gearing for driving one of the carrier means from said shaft in one direction, gearing for driving the other carrier means from said shaft in the other direction, and an inclined passage lying on the same side of the pair of drums for conducting the packages from one drum to the other.

6. In an apparatus for treating packaged goods, a plurality of longitudinally alined drums, means for introducing packages to be treated into opposite sides of adjacent drums adjacent corresponding ends, means for extracting the treated packages from opposite sides of adjacent drums adjacent the other ends, and a passage connecting the extracting means of one drum with the introducing means of the next drum.

7. In an apparatus for treating packaged goods, a pair of drums arranged longitudinally of one another, rotary carrier means for conveying the packages thru the drums, unitary means for rotating said carrier means in opposite directions, and means for gravitally conducting said packages from one drum to the other.

8. In an apparatus for treating packaged goods, a pair of drums arranged longitudinally of one another, rotary carrier means for conveying the packages thru the drums, unitary means for rotating said carrier means in opposite directions, and an inclined passage on the same side of the drums for connecting adjacent drums to gravitally conduct packages from one drum to the other.

9. An apparatus for treating packaged goods comprising a series of treating drums in longitudinal alinement, rotary carrier means for the packages arranged in each drum, means for gravitally conducting the packages from one drum to an adjacent drum, and means for rotating the carrier means in the direction of movement of the packages as they leave and enter the drums respectively.

10. An apparatus for treating packaged goods comprising a series of treating drums in longitudinal alinement, rotary carrier means for the packages arranged in each drum, an inclined passage connecting adjacent ends of adjacent drums for gravitally conducting the packages from one drum to an adjacent drum, and means for rotating the carrier means in the direction of movement of the packages as they leave and enter the drums respectively.

In testimony whereof, I have hereunto set my hand.

CARL B. THORIN.